United States Patent [19]
Anderson et al.

[11] Patent Number: 6,096,261
[45] Date of Patent: Aug. 1, 2000

[54] COHERENT JET INJECTOR LANCE

[75] Inventors: John Erling Anderson, Somers; Pravin Chandra Mathur, Bronx; Ronald Joseph Selines, North Salem, all of N.Y.

[73] Assignee: Praxair Technology, Inc., Danbury, Conn.

[21] Appl. No.: 08/975,154

[22] Filed: Nov. 20, 1997

[51] Int. Cl.[7] .................................................. C21C 5/32
[52] U.S. Cl. .......................................... 266/225; 266/265
[58] Field of Search ...................................... 266/225, 265

[56] References Cited

U.S. PATENT DOCUMENTS

| | | | |
|---|---|---|---|
| 3,972,517 | 8/1976 | Kraizinger et al. | 266/225 |
| 4,210,442 | 7/1980 | Lewis, III et al. | 75/60 |
| 4,373,949 | 2/1983 | Spruell et al. | 75/60 |
| 4,599,107 | 7/1986 | Masterson | 75/59.2 |
| 5,302,325 | 4/1994 | Cheng | 261/76 |
| 5,572,544 | 11/1996 | Mathur et al. | 373/8 |
| 5,714,113 | 2/1998 | Gitman et al. | 266/225 |

OTHER PUBLICATIONS

Stoecker et al., "Fundamental Concepts of Oxygen Cutting", Welding Journal, pp. 151s–156s (Dec. 1957).

*Primary Examiner*—Scott Kastler
*Attorney, Agent, or Firm*—Stanley Ktorides

[57] ABSTRACT

A lance which may be used to establish a long coherent gas jet which includes a primary passageway having a converging/diverging nozzle, and two radially spaced secondary passageways for establishing a flame barrier, each of the passageways communicating with an injection space defined by a protective jacket.

8 Claims, 3 Drawing Sheets

COHERENT JET INJECTOR LANCE

TECHNICAL FIELD

This invention relates generally to apparatus for producing a flow of gas. The invention is especially useful for producing a flow of gas for introduction into a liquid, such as molten metal, which creates a harsh environment for the gas injection device.

BACKGROUND ART

It is often desired to establish a flow of gas. For example, a flow of gas may be injected into a liquid for one or more of several reasons. A reactive gas may be injected into a liquid to react with one or more components of the liquid, such as, for example, the injection of oxygen into molten iron to react with carbon within the molten iron to decarburize the iron and to provide heat to the molten iron. Oxygen may be injected into other molten metals such as copper, lead and zinc for smelting purposes. A non-reactive gas, such as an inert gas, may be injected into a liquid to stir the liquid in order to promote, for example, better temperature distribution or better component distribution throughout the liquid.

Often the liquid is contained in a vessel such as a reactor or a melting vessel wherein the liquid forms a pool within the vessel conforming to the bottom and some length of the sidewalls of the vessel, and having a top surface. When injecting gas into the liquid pool, it is desirable to have as much gas as possible flow into the liquid to carry out the intent of the gas injection. Accordingly gas is injected from a gas injection device into the liquid below the surface of the liquid. If the nozzle for a normal gas jet were spaced some distance above the liquid surface, then much of the gas impinging on the surface will be deflected at the surface of the liquid and will not enter the liquid pool. Moreover, such action causes splashing of the liquid which can result in loss of material and in operating problems.

Submerged injection of gas into liquid using bottom or side wall mounted gas injection devices, while very effective, has operation problems when the liquid is a corrosive liquid or is at a very high temperature, as these conditions can cause rapid deterioration of the gas injection device and localized wear of the vessel lining resulting in both the need for sophisticated external cooling systems and in frequent maintenance shut-downs and high operating costs. One expedient is to bring the tip or nozzle of the gas injection device close to the surface of the liquid pool while avoiding contact with the liquid surface and to inject the gas from the gas injection device at a high velocity so that a significant portion of the gas passes into the liquid. However, this expediency is still not satisfactory because the proximity of the tip of the gas injection device to the liquid surface may still result in significant damage to this equipment. Moreover, in cases where the surface of the liquid is not stationary, the nozzle would have to be constantly moved to account for the moving surface so that the gas injection would occur at the desired location and the required distance between the lance tip and bath surface would be maintained. For electric arc furnaces, this requires complicated hydraulically driven lance manipulators which are expensive and require extensive maintenance.

Another expedient is to use a pipe which is introduced through the surface of the liquid pool. For example, non-water cooled pipes are often used to inject oxygen into the molten steel bath in an electric arc furnace. However, this expediency is also not satisfactory because the rapid wear of pipe requires complicated hydraulically driven pipe manipulators as well as pipe feed equipment to compensate for the rapid wear rate of the pipe. Moreover, the loss of pipe, which must be continuously replaced, is expensive.

These problems can be solved if a coherent jet can be established. A coherent gas jet retains its diameter and velocity, after injection, far longer than does a normal gas jet. With a coherent jet, the injector tip may be positioned significantly further from the liquid surface while still enabling virtually all of the gas within the coherent gas jet to penetrate the liquid surface.

Moreover, coherent jets will find use in other applications, such as combustion applications, where gas jets are currently employed.

Accordingly, it is an object of this invention to provide an apparatus for injecting gas into a volume so that the injected gas forms a coherent gas jet.

SUMMARY OF THE INVENTION

The above and other objects, which will become apparent to those skilled in the art upon a reading of this disclosure, are attained by the present invention which is:

A coherent jet injector lance comprising:

(A) an injector assembly having:
   (1) a primary passageway, an injection space, and a nozzle having an inlet communicating with the primary passageway and having an outlet communicating with the injection space;
   (2) a first secondary passageway radially spaced from the primary passageway and communicating with the injection space; and
   (3) a second secondary passageway radially spaced from the first secondary passageway and communicating with the injection space; and (B) a jacket covering the injector assembly, said jacket extending past the nozzle outlet to define the injection space.

The numerals in the Figures are the same for the common elements.

DETAILED DESCRIPTION

Figure 1:
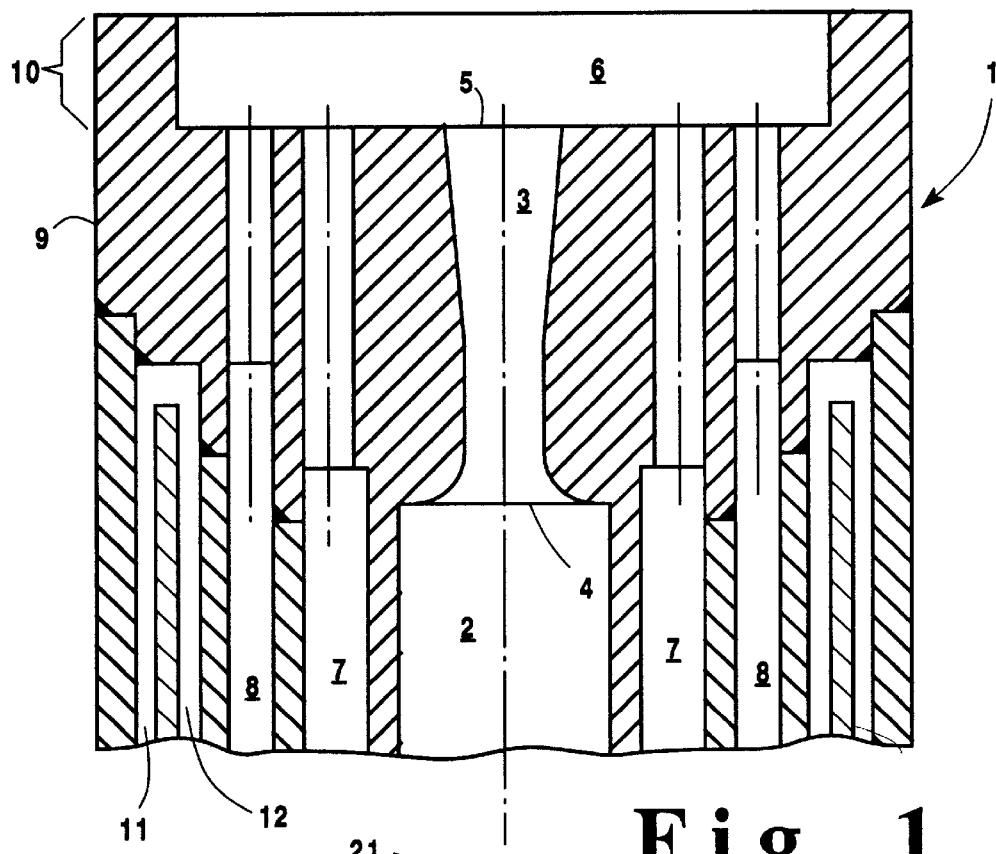
FIG. 1 is a cross-sectional representation of one preferred embodiment of the coherent jet injector lance of this invention.

The invention will be described in detail with reference to the Drawings. Referring now to FIG. 1, coherent jet injector 1 comprises an injector assembly and an outer jacket. The injector assembly includes a primary passageway 2 which communicates with a source of primary gas (not shown). The primary gas may be any gas of which is desired the formation of a coherent jet. Examples of such gas include oxygen, nitrogen, argon, hydrogen, helium, gaseous hydrocarbon fuel and mixtures comprising two or more thereof. Primary passageway 2 also communicates with nozzle 3. Preferably for at least a portion of its length, nozzle 3 has a diameter which is less than the diameter of primary passageway 2 and is less than the diameter of injection space 6. Most preferably, as illustrated in FIG. 1, nozzle 3 is a converging/diverging nozzle. Converging/diverging nozzle 3 has an inlet 4, which communicates with primary passageway 2, and has an outlet 5 which communicates with injection space 6.

Radially spaced from primary passageway 2 is first secondary passageway 7, and radially spaced from first secondary passageway 7 is second secondary passageway 8. One of the first and second secondary passageways communicates with a source of oxidant (not shown), and the other of the first and second secondary passages communicates with a source of fuel (not shown). When oxygen is the primary gas first secondary passageway 7 preferably communicates with a source of fuel and second secondary passageway 8 communicates with a source of oxidant. The oxidant is preferably a fluid which contains at least 30 mole percent oxygen, most preferably at least 90 mole percent oxygen. The oxidant may be technically pure oxygen having an oxygen concentration of 99.5 mole percent or more. The fuel may be any fluid fuel such as methane, propane, butylene, natural gas, hydrogen, coke oven gas, or oil.

Each of the first and second secondary passageways communicates with injection space 6 preferably, as illustrated in FIG. 1, even or flush with outlet 5 of converging/diverging nozzle 3. FIG. 1 illustrates a preferred embodiment of the invention wherein each of the first and second secondary passageways becomes a plurality of individual passages such that each of the first and second secondary passageways communicates with injection space 6 as a ring of holes around outlet 5. Alternatively, one or both of the first and second secondary passageways could communicate with injection space 6 as a circular annulus to outlet 5.

Figure 2:
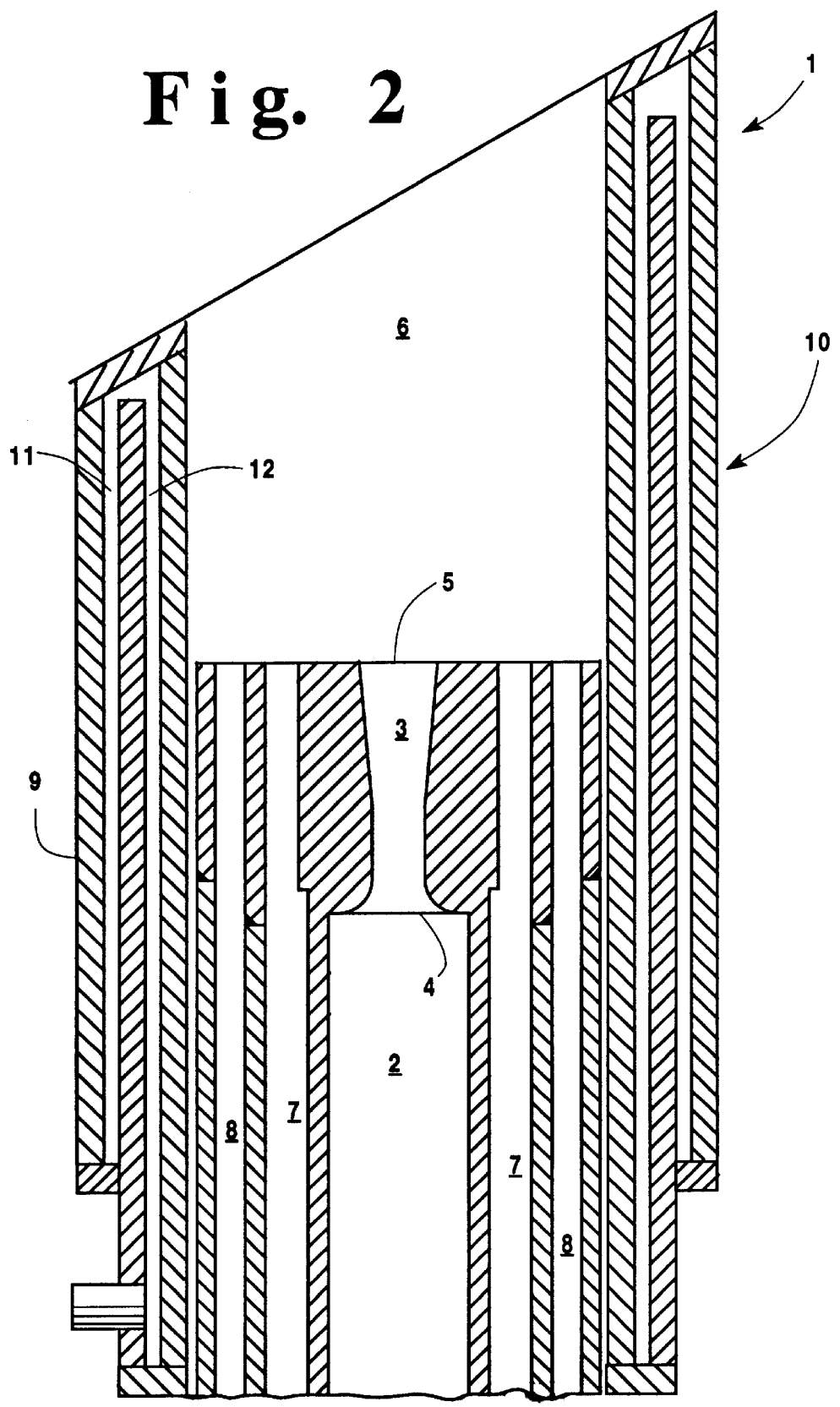
FIG. 2 is a cross-sectional representation of another preferred embodiment of the coherent jet injector lance of this invention.

The injector assembly is covered by a jacket 9 which runs along the length of the injector assembly and has a jacket extension portion 10 which extends past nozzle outlet 5 to define injection space 6. Jacket extension portion 10 has a length generally up to 12 inches and preferably within the range of from 0.5 to 7.0 inches. The jacket extension need not be the same length around the entire injector assembly and may have a length on one side of the injector assembly which exceeds its length on the other side of the injector assembly. One such embodiment is illustrated in FIG. 2. Such an embodiment is particularly advantageous when mounted angularly in the sidewall of a vessel. Jacket 9 may be cooled by the circulation of coolant, e.g. water, in coolant inflow passage 11 and coolant outflow passage 12. The injection space or volume 6 formed by jacket extension portion 10 establishes a protective zone which serves to protect the gas streams immediately upon their flow out of the primary and secondary passages. This improves the integrity of the coherent jet by providing a conducive environment for its initial formation.

Figure 3:
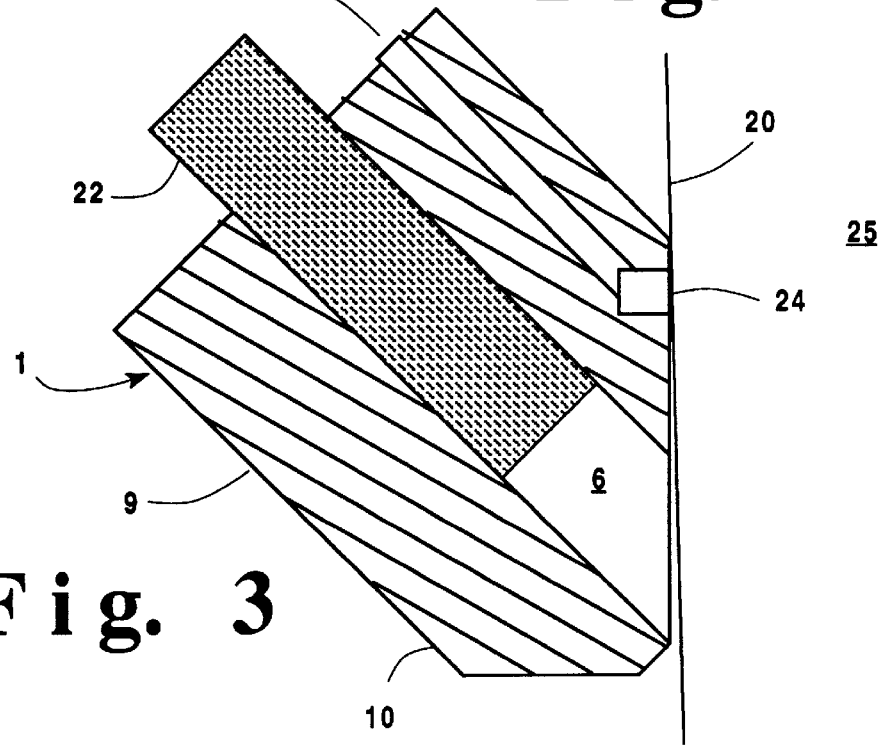
FIG. 3 is a simplified cross-sectional representation of an embodiment of the coherent jet lance of the invention placed in a vessel sidewall.

Typically the coherent jet injector lance of this invention is positioned in the wall or roof of a vessel, such as a furnace, and is used to inject a flow of gas, as a coherent gas jet, into the vessel. FIG. 3 illustrates one such arrangement wherein the coherent jet injector lance is mounted angularly in the sidewall 20 of a vessel, e.g. an electric arc furnace, so as to inject gas into the interior 25 of the vessel. In FIG. 3 the injector assembly is represented by the dark rectangle 22.

In operation, the primary gas is ejected out from lance 1 and forms primary gas stream typically having a velocity of 1000 feet per second (fps) or more. Fuel and oxidant are ejected out from lance 1 and form annular streams which begin mixing immediately upon ejection from lance 1 and combust to form a flame envelope around the primary gas stream. If the invention is employed in a hot environment such as a metal melting furnace, no separate ignition source for the fuel and oxidant is required. If the invention is not employed in an environment wherein the fuel and oxidant will auto ignite, an ignition source such as a spark generator will be required. Preferably the flame envelope will have a velocity less than the velocity of the primary gas stream and generally within the range of from 50 to 1000 fps. The flame envelope forms a fluid shield or barrier around the primary gas stream. This barrier greatly reduces the amount of ambient gases which are entrained into the high velocity primary gas stream, thus serving to maintain the primary gas stream coherent for a significant distance after ejection from the lance. This enables the placement of the lance such that the lance tip is spaced by a larger distance from where the primary gas impacts or otherwise engages another fluid or solid, thus enhancing safety and better preserving the integrity of the lance.

Generally the amount of fuel and oxidant provided from the lance will be just enough to form an effective flame envelope for the desired length of the primary gas stream. However there may be times when it is desired that significantly more fuel and oxidant is passed out from the lance so that the flame envelope not only serves to shield the primary gas stream from entrainment of ambient gas, but also serves to provide significant heat into the vessel. That is, the lance may, in some embodiments of this invention, function also as a burner.

Figure 5:
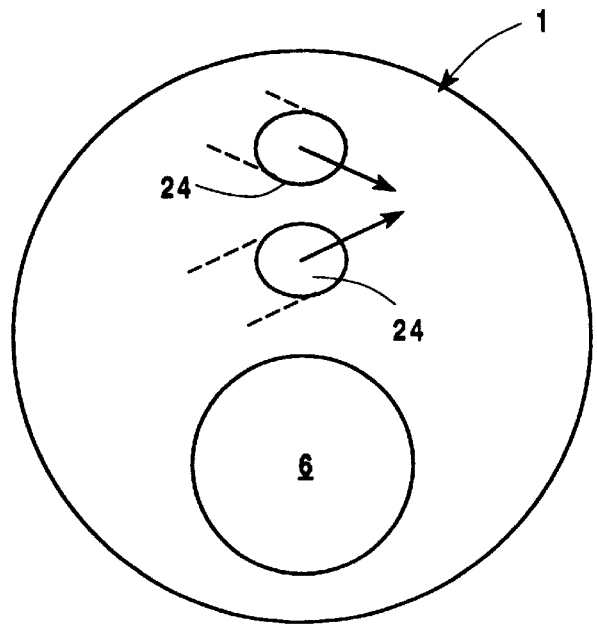
FIG. 5 is a simplified head-on view of an embodiment of the coherent jet injector lance of the invention having additional injection passages in the jacket which eject converging streams.
Figure 4:
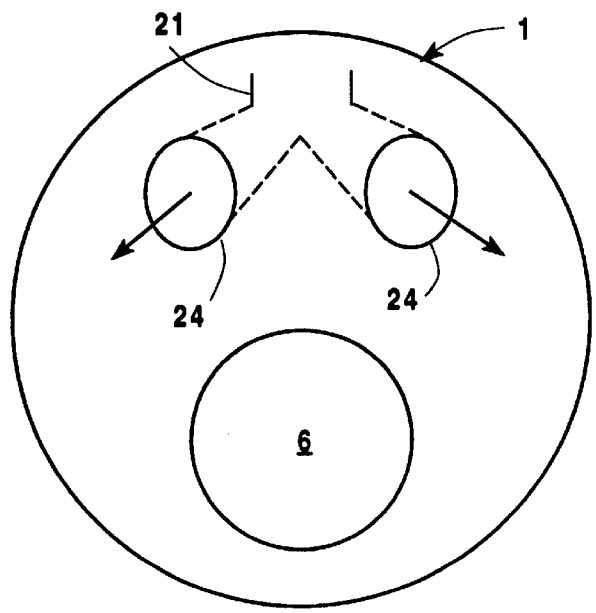
FIG. 4 is a simplified head-on view of an embodiment of the coherent jet injector lance of the invention having additional injection passages in the jacket which eject diverging streams.

The jacket of the coherent jet injector lance of this invention may contain one or more additional passages for providing additional fluid or fluids or for providing one or more streams of solid particles into the vessel into which the coherent primary gas jet is injected. This is illustrated in FIG. 3 by additional passage 21 having injection opening 24. Additional passage or passages 21 may be advantageously employed with the coherent jet injector lance of this invention to provide post combustion oxygen into an electric arc furnace for carrying out the post combustion method disclosed and claimed in U.S. Pat. No. 5,572,444-Mathur et al. while the injector assembly is used to provide main oxygen into the molten metal. The additional passage or passages may provide the additional fluid or stream of particle in a stream or streams running parallel with the coherent primary gas jet or in a stream or streams angled toward or away from the primary coherent gas jet. FIG. 4 illustrates an embodiment of the invention which may be employed to provide two additional diverging streams, and FIG. 5 illustrates an embodiment of the invention which maybe employed to provide two additional streams from the lance such that these two streams intersect downstream of the lance i.e. the streams are converging. The axis of a passage or of a gas stream is the imaginary line running through the center of the passage or the gas stream along its length. The axis of the primary passageway is illustrated in FIG. 1.

The following are preferred specifications for the design of the coherent jet injector lance of this invention.

(1) Flow rate through primary passageway 20–150 MCFH at NTP (Normal Temperature and Pressure) Supply Pressure (upstream of nozzle): 50–300 psig Throat Diameter for Converging-Diverging Nozzle $D = K(Q/P)^{1/2}$ D—Throat Diameter—inches
Q—CFH at NTP for the primary gas flow rate
P—Absolute Pressure (psig)

K=0.03 to 0.04

D=¼" to 2."

(2) Oxygen to ring of holes or annulus surrounding nozzle $D_{eq} = CQ^{1/4}$ $D_{eq}$=Diameter of tube equivalent in cross sectional area of ring of holes or annulus $D_{eq}$=Square root of [cross sectional area of ring of holes or annulus (sq inches) divided by (Pi/4)]

Q—CFH at NTP for the primary gas flow rate

C=0.013 to 0.16

(3) Fuel to ring of holes or annulus surrounding nozzle $D^{eq} = JQ^{1/4}/H^{1/2}$ Q—CFH at NTP for the primary gas flow rate
H—Heating Value of Fuel—BTU/CF (at NTP)

J=0.4 to 5.0

Now with the use of this invention one can effectively establish a flow of gas as a coherent gas jet. Although the invention has been described in detail with reference to certain preferred embodiments, those skilled in the art will recognize that there are other embodiments of the invention within the spirit and the scope of the claims.

We claim:

1. A coherent jet injector lance comprising:
   (A) an injector assembly having:
      (1) a primary passageway, an injection space, and a converging/diverging nozzle having an inlet communicating with the primary passageway and having an outlet communicating with the injection space;
      (2) a first secondary passageway radially spaced from the primary passageway, oriented parallel with the primary passageway and communicating with the injection space flush with the nozzle outlet; and
      (3) a second secondary passageway radially spaced from the first secondary passageway, oriented parallel with the primary passageway and communicating with the injection space flush with the nozzle outlet; and
   (B) a jacket covering the injector assembly, said jacket extending past the nozzle outlet to define the injection space.

2. The coherent jet injector lance of claim 1 wherein the jacket extends past the nozzle outlet for a greater distance on one side of the injector assembly compared to the other side of the injector assembly.

3. The coherent jet injector lance of claim 1 wherein the jacket comprises at least one additional passage for the provision of a stream comprising at least one of fluid or particles.

4. The coherent jet injector lance of claim 4 wherein at least one additional passage within the jacket has an axis which is at an angle to the axis of the primary passageway.

5. The coherent jet injector lance of claim 4 comprising at least two additional passages within the jacket which are oriented such that the axes of fluid streams ejected from said additional passages intersect.

6. The coherent jet injector lance of claim 4 comprising at least two additional passages within the jacket which are oriented such that the axes of the fluid streams ejected from said additional passages diverge.

7. A vessel having a sidewall and mounted in said sidewall a coherent jet injector lance comprising:
   (A) an injector assembly having:
      (1) a primary passageway, an injection space, and a nozzle having an inlet communicating with the primary passageway and having an outlet communicating with the injection space;
      (2) a first secondary passageway radially spaced from the primary passageway, oriented parallel with the primary passageway and communicating with the injection space flush with the nozzle outlet; and
      (3) a second secondary passageway radially spaced from the first secondary passageway, oriented parallel with the primary passageway and communicating with the injection space flush with the nozzle outlet; and
   (B) a jacket covering the injector assembly, said jacket extending past the nozzle outlet to define the injection space.

8. A vessel having a sidewall and mounted angularly in said sidewall a coherent jet injector lance comprising:
   (A) an injector assembly having:
      (1) a primary passageway, an injection space, and a nozzle having an inlet communicating with the primary passageway and having an outlet communicating with the injection space;
      (2) a first secondary passageway radially spaced from the primary passageway, oriented parallel with the primary passageway and communicating with the injection space flush with the nozzle outlet; and
      (3) a second secondary passageway radially spaced from the first secondary passageway, oriented parallel with the primary passageway and communicating with the injection space flush with the nozzle outlet; and
   (B) a jacket covering the injector assembly, said jacket extending past the nozzle outlet to define the injection space, wherein the jacket extends past the nozzle outlet for a greater distance on one side of the injector assembly compared to the other side of the injector assembly.

* * * * *

UNITED STATES PATENT AND TRADEMARK OFFICE
CERTIFICATE OF CORRECTION

PATENT NO. : 6,096,261
DATED : August 1, 2000
INVENTOR(S) : Anderson et al.

It is certified that error appears in the above-identified patent and that said Letters Patent is hereby corrected as shown below:

Title page item [56] under References Cited insert the following:

```
--U.S. 3,216,714    Eibl et al.      11/1965
  U.S. 3,427,151    Koudelka et al.  2/1969
  U.S. 3,889,933    Jaquay           6/1975
  U.S. 5,120,026    Bissonnette      6/1992
  U.S. 5,599,375    Gitman           2/1997
  U.S. 5,700,421    Bissonnette      12/1997
  WO 89/12051       Saltin et al.    12/1989--
```

Signed and Sealed this

Seventeenth Day of April, 2001

Attest:

NICHOLAS P. GODICI

Attesting Officer      Acting Director of the United States Patent and Trademark Office